United States Patent
Claußen et al.

(10) Patent No.: US 12,459,847 B2
(45) Date of Patent: *Nov. 4, 2025

(54) GLASS CERAMIC AND METHOD FOR PRODUCING A GLASS CERAMIC

(71) Applicant: Schott AG, Mainz (DE)

(72) Inventors: Olaf Claußen, Undenheim (DE); Steffen Grün, Wallhausen (DE); Thomas Lifka, Mainz-Bretzenheim (DE); André Schrepfer, Frankfurt a. M. (DE)

(73) Assignee: Schott AG, Mainz (DE)

( * ) Notice: Subject to any disclaimer, the term of this patent is extended or adjusted under 35 U.S.C. 154(b) by 482 days.

This patent is subject to a terminal disclaimer.

(21) Appl. No.: 17/940,639

(22) Filed: Sep. 8, 2022

(65) Prior Publication Data

US 2023/0081248 A1    Mar. 16, 2023

(30) Foreign Application Priority Data

Sep. 8, 2021 (DE) .................. 10 2021 123 303.8
Sep. 8, 2021 (DE) .................. 10 2021 123 304.6

(51) Int. Cl.
*C03B 5/225* (2006.01)
*C03B 5/235* (2006.01)
(Continued)

(52) U.S. Cl.
CPC .......... *C03B 5/225* (2013.01); *C03B 5/2353* (2013.01); *C03B 32/02* (2013.01); *C03C 1/004* (2013.01);
(Continued)

(58) Field of Classification Search
None
See application file for complete search history.

(56) References Cited

U.S. PATENT DOCUMENTS 6,698,244 B1 * 3/2004 Romer .................. C03B 5/44
65/135.2
2010/0313604 A1 * 12/2010 Watson .................. F23L 7/007
65/347

(Continued)

FOREIGN PATENT DOCUMENTS

DE   10 2004 022 936 A1   12/2005
DE   10 2004 052 514 A1   5/2006
(Continued)

OTHER PUBLICATIONS

German Office Action dated Jan. 12, 2022 for German Application No. 10 2021 123 303.8 (7 pages).
(Continued)

*Primary Examiner* — Christina A Johnson
(74) *Attorney, Agent, or Firm* — TAYLOR & EDELSTEIN, PC (57) ABSTRACT

A method for producing a glass ceramic includes: providing a batch of raw materials; heating the batch of raw materials until a melt is obtained, the batch of raw materials being heated at least in a plurality of sections to a temperature above T3 which corresponds to a viscosity of a molten glass of $10^3$ dPa*s; refining the melt, the melt being heated at least in a plurality of sections to a temperature above T2.5 which corresponds to a viscosity of the molten glass of $10^{2.5}$ dPa*s; obtaining a refined glass which is configured for being ceramized to form a glass ceramic material; and ceramizing a glass which is configured for being ceramized to form the glass ceramic material, at least one of the step of heating until the melt is obtained and the step of refining being performed with heating by way of $H_2$ and $O_2$ combustion.

18 Claims, 3 Drawing Sheets

(51) Int. Cl.
*C03B 32/02* (2006.01)
*C03C 1/00* (2006.01)
*C03C 10/00* (2006.01)

(52) U.S. Cl.
CPC ...... *C03C 10/0027* (2013.01); *C03C 2204/00* (2013.01)

(56) References Cited

U.S. PATENT DOCUMENTS

| 2023/0021281 | A1* | 1/2023 | Römer ................... C03B 5/225 |
| 2023/0074664 | A1* | 3/2023 | Claußen ................. C03C 3/087 |

FOREIGN PATENT DOCUMENTS

| DE | 10 2020 106 050 A1 | 9/2021 |
| WO | 2015/124740 A1 | 8/2015 |

OTHER PUBLICATIONS

German Office Action dated Jan. 12, 2022 for German Application No. 10 2021 123 304.6 (6 pages).

* cited by examiner

GLASS CERAMIC AND METHOD FOR PRODUCING A GLASS CERAMIC

CROSS REFERENCE TO RELATED APPLICATIONS

This claims priority to (a) German patent application no. DE 10 2021 123 304.6, filed Sep. 8, 2021, which is incorporated herein by reference, and (b) German patent application no. DE 10 2021 123 303.8, filed Sep. 8, 2021, which is incorporated herein by reference.

BACKGROUND OF THE INVENTION

1. Field of the Invention

The present invention relates to a method for producing a glass ceramic as well as a glass ceramic.

2. Description of the Related Art

In the production of glass ceramics it is necessary to use large quantities of energy in order to be able to reach the high temperatures required for production.

The steps of melting the non-vitreous starting materials and a subsequently refining step should be mentioned in particular here. This applies above all to glass ceramics with low and zero expansion which are produced in a discontinuous process over several days.

The energy required for the process is currently obtained substantially from fossil fuels. It is, however, desirable on ecological grounds to convert here to more environmentally friendly energy sources or to expand the proportion of environmentally friendly technologies in order to reduce the output of $CO_2$ associated with production.

There is also a need on ecological grounds to reduce the use of the multivalent oxides used in refining. This applies in particular to critical refining agents such as, for example, $Sb_2O_3$ and $As_2O_3$.

As explained, in the production of glasses and glass ceramics, these normally undergo a refining process after the melt. Thereby, among other things, $CO_2$ and $H_2O$ bubbles which are formed during the melting process, e.g. as a result of the decomposition of the raw materials based on carbonate or hydroxide, shall be removed from the glass melt. During the refining phase of glass production, the bubbles located in the glass melt grow so that they rise and can leave the melt via the surface.

In the case of conventional refining methods, the glass melt is brought to a high temperature in a part of the melting tank, i.e. in a refining section of a melting tank, or a downstream region, e.g. a refining chamber. If the melt contains refining agent, the refining agents release a refining gas, such as e.g. $O_2$. The refining gas diffuses into existing bubbles and enlarges these to such an extent that the bubbles rise in the melt and can leave it.

Legal provisions currently apply to some of the traditional refining agents, such as e.g. the multivalent oxide refining agents $Sb_2O_3$ and $As_2O_3$, in order to avoid their use or only use them in an environmentally sustainable manner, but there are also customer demands which require a reduced use of such refining agents.

Acceptable, environmentally sustainable refining agents, such as e.g. $SnO_2$, can, in too high concentrations, have a disadvantageous effect on some glass properties such as transmission and susceptibility to crystallization.

What is needed in the art therefore is such a method.

SUMMARY OF THE INVENTION

In a first aspect, the present invention relates to a method for producing a glass ceramic, including the steps:
providing a batch of raw materials;
heating the batch until a melt is obtained, wherein the batch is heated at least in sections to a temperature above T3 which corresponds to a viscosity of the molten glass of $10^3$ dPa*s;
refining the melt, wherein the melt is heated at least in sections to a temperature above T2.5 which corresponds to a viscosity of the molten glass of $10^{2.5}$ dPa*s;
obtaining a refined glass which can be ceramized to form glass ceramic; and
ceramizing the glass which can be ceramized to form glass ceramic, wherein the melting and/or refining is performed with heating by way of $H_2$ and $O_2$ combustion.

In a second aspect, the present invention relates to a glass ceramic, produced according to the method according to the present invention.

In a third aspect, the present invention relates to a glass ceramic, wherein less than 500 kg, optionally less than 100 kg, of $CO_2$ is released per tonne of glass as a result of the production of the green glass.

In a fourth aspect, the present invention relates to a precision component including a glass ceramic according to the present invention and/or produced according to the method according to the present invention.

In a fifth aspect, the present invention relates to the use of the precision component according to the present invention.

Definitions and Methods

A "bubble" is a gaseous inclusion within a glass or a glass melt which has generally a diameter of at least 10 μm. "Diameter" refers here to the spherical equivalence diameter. If the "size" of a bubble is discussed in the description, this refers to the spherical equivalence diameter. Within this description, the term "bubble" can be understood both as a gaseous inclusion in the widest sense as well as a "$CO_2$ bubble" or "$O_2$ bubble" in one particular meaning.

The "oxygen-fuel equivalence ratio λ" defines the quantity of oxygen which is necessary for a complete reaction or conversion of the fuels into combustion products, such as e.g. $H_2O$, $CO_2$ and $NO_x$. λ=1.00 is correspondingly stoichiometric, wherein fuel-rich mixtures have a λ<1.00, and mixtures with a low level of fuel have a λ>1.00. Mixtures with a low level of fuel with λ>1.00 therefore enable a complete conversion of the fuel, with an excess of (remaining) oxygen.

Where the term "ppm" is used in this description in the context of solids or liquids, this should be understood as 'mass/mass'; in the context of gases, "ppm" refers to 'volume/volume'.

"Dwell time" is the time which a specific part of the glass melt remains in a specific container or partial container (e.g. melting vessel or refining vessel) in a continuous method before it is removed. The "minimal dwell time" is the time which a specific part of the glass melt remains in the container or partial container in a continuous method even if this part crosses the container or partial container by the quickest path. The "average dwell time" is defined as the ratio between "(partial) container volume [m³]" and the "(partial) container throughput [m³ h⁻¹]".

"Refining period" is the time which a specific part of the glass melt remains in a specific container or partial container (e.g. refining vessel) for the purpose of refining in a discontinuous method before it is removed. In this case, the melt has at least in sections a temperature above T2.5 which corresponds to a viscosity of the molten glass of $10^{2.5}$ dPa*s.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

In a first aspect, the invention relates to a method for producing a glass ceramic, including the steps:
  providing a batch of raw materials;
  heating the batch until a melt is obtained, wherein the batch is heated at least in sections to a temperature above T3 which corresponds to a viscosity of the molten glass of $10^3$ dPa*s;
  refining the melt, wherein the melt is heated at least in sections to a temperature above T2.5 which corresponds to a viscosity of the molten glass of $10^{2.5}$ dPa*s;
  obtaining a refined glass which can be ceramized to form glass ceramic; and
  ceramizing the glass which can be ceramized to form glass ceramic,
wherein the melting and/or refining is performed with heating by way of $H_2$ and $O_2$ combustion.

According to the present invention, the method is performed with heating by way of $H_2$ and $O_2$ combustion. In one embodiment of the method, at least 10%, at least 25%, at least 50%, at least 75%, at least 90%, or at least 99%, of the energy required for the method is provided by way of $H_2$ and $O_2$ combustion.

In one embodiment of the method, the step of heating the batch until a melt is obtained is performed, wherein the batch is heated at least in sections to a temperature above T3 which corresponds to a viscosity of the molten glass of $10^3$ dPa*s, wherein the batch is heated at most to a temperature T2.5 which corresponds to a viscosity of the molten glass of $10^{2.5}$ dPa*s.

In one embodiment of the method, the step of heating the batch until a melt is obtained is performed, wherein the batch is heated at least in sections to a temperature above T7.6. T7.6 is the temperature which corresponds to a viscosity of $10^{7.6}$ dPa·s. In one optional embodiment of the method, the step of heating the batch until a melt is obtained is performed, wherein the entire batch is heated to a temperature above T7.6.

In one embodiment of the method, the step of refining the melt is performed, wherein the melt is heated at least in sections to a temperature above T2.5 which corresponds to a viscosity of the molten glass of $10^{2.5}$ dPa*s, wherein the melt is optionally heated at least to a temperature T2.2 which corresponds to a viscosity of the molten glass of $10^{2.2}$ dPa*s, and/or wherein the melt is heated at most to a temperature T2 which corresponds to a viscosity of the molten glass of $10^2$ dPa*s.

In one embodiment, the method is performed with heating by way of $H_2$ and $O_2$ combustion, wherein at least 50%, at least 80%, at least 90%, or at least 99%, of the $H_2$ and $O_2$ is made available from the electrolysis of $H_2O$. The electrolysis of $H_2O$ is optionally operated by renewable energies. This is advantageous because the environmental impact is thus minimized, fossil fuels are dispensed with, and thus a reduction in the $CO_2$ output is enabled.

In one embodiment, the method is performed in the case of an oxygen to fuel equivalence ratio λ which is lower than 1.05. This is in particular advantageous in the sense of the economical use of oxygen which can react (almost) entirely. In one embodiment, the method is performed in the case of an oxygen to fuel equivalence ratio λ of at least 1.00. It is equally advantageous to keep the additional input of oxygen low in order to promote the reduction of the oxygen partial pressure $p(O_2)$ during refining of the melt.

In one embodiment, the present invention relates to a method, wherein the melting and/or refining is performed with heating by way of $H_2$ and $O_2$ combustion, wherein the melting is performed in the case of an oxygen to fuel equivalence ratio λ>1.00, in particular >1.05, and/or the refining is performed in the case of an oxygen to fuel equivalence ratio λ<1.05, in particular <1.00.

Such a method is advantageous because it exploits the (above-mentioned) advantages of an oxygen to fuel equivalence ratio λ>1.00 during melting and combines them with the advantages of an oxygen to fuel equivalence ratio of λ<1.00, in particular <1.05, during refining, keeps the additional input of oxygen low in particular in the refining phase in order to promote the reduction in the oxygen partial pressure $p(O_2)$ during refining of the melt.

In comparison with conventional methods which perform the melting and/or refining with heating by way of fossil fuels and $O_2$ combustion, as a result of the incomplete combustion, it is not possible to operate in the case of an oxygen to fuel equivalence ratio λ of approximately >1.00 during melting. The input of CO and/or C as a result of the incomplete combustion leads to numerous undesirable problems in the melt and in the method apparatus. The stated disadvantages would come to bear to an even greater extent during heating with fossil fuels if the refining is performed in the case of an oxygen to fuel equivalence ratio λ<1.05, in particular <1.00.

In one embodiment of the present invention, the glass ceramic involves a transparent glass ceramic, optionally a $Li_2O$—$Al_2O_3$—$SiO_2$-(LAS) glass ceramic.

According to one aspect of the present invention, a LAS glass ceramic is made available which has an average thermal coefficient of expansion CTE in the range from 0 to 50° C. of at most $0.1 \times 10^{-6}$/K, i.e. a zero-expanding LAS glass ceramic.

According to one aspect of the present invention, a LAS glass ceramic is made available which has an average thermal coefficient of expansion CTE in the range from 0 to 50° C. of at least $0.001\times10^{-6}$/K, at least $0.005\times10^{-6}$/K, or at least $0.01\times10^{-6}$/K.

According to the present invention, the term glass ceramic refers to inorganic, non-porous materials with a crystalline phase and a vitreous phase, wherein the matrix, i.e. the continuous phase, is generally a glass phase. To produce the glass ceramic, the components of the glass ceramic are firstly mixed, melted and refined and then the glass melt obtained in this manner, i.e. a glass which can be ceramized to form a glass ceramic, the so-called green glass, is cast, for example, into a mold. The glass which can be ceramized to form a glass ceramic is crystallized in a controlled manner by reheating after cooling and setting (what is known as "controlled volume crystallization"). The chemical composition (analysis) of the glass which can be ceramized to form a glass ceramic and the glass ceramic produced therefrom are identical, only the inner structure of the material being changed by the ceramization. Therefore, if the composition of the glass ceramic is discussed below, that which has been stated equally applies to the precursor of the glass ceramic, i.e. the glass which can be ceramized to form a glass ceramic or the green glass.

In one embodiment, the glass which can be ceramized to form glass ceramic or the glass ceramic includes the following composition (in wt.-% on an oxide basis):

| | |
|---|---|
| $SiO_2$ | 35-72, optionally 45-72 |
| $Al_2O_3$ | 15-33 |
| $P_2O_5$ | 0-12 |
| $Li_2O$ | 2-6 |
| $Na_2O$ | 0-2 |
| $K_2O$ | 0-3 |
| MgO | 0-3 |
| CaO | 0-4 |
| BaO | 0-5 |
| SrO | 0-3 |
| ZnO | 0-8 |
| $TiO_2$ | 1-6 |
| $ZrO_2$ | 0-5 |

In one embodiment, the glass which can be ceramized to form glass ceramic or the glass ceramic includes the following composition (in wt.-% on an oxide basis):

| | |
|---|---|
| $SiO_2$ | 45-72 |
| $Al_2O_3$ | 15-33 |
| $P_2O_5$ | 0-12 |
| $Li_2O$ | 2-6 |
| $Na_2O$ | 0-2 |
| $K_2O$ | 0-3 |
| MgO | 0-3 |
| CaO | 0-4 |
| BaO | 0-5 |
| SrO | 0-3 |
| ZnO | 0-5 |
| $TiO_2$ | 0-6 |
| $ZrO_2$ | 0-5 |

In a further embodiment, the glass which can be ceramized to form glass ceramic or the glass ceramic includes the following composition (in wt.-% on an oxide basis):

| | |
|---|---|
| $SiO_2$ | 50-70 |
| $Al_2O_3$ | 17-32 |
| $P_2O_5$ | 3-12 |
| $Li_2O$ | 2-5 |
| $Na_2O$ | 0-2 |
| $K_2O$ | 0-2 |
| MgO | 0-2 |
| CaO | 0-4 |
| BaO | 0-5 |
| SrO | 0-2 |
| ZnO | 0-4 |
| $TiO_2$ | 0-5 |
| $ZrO_2$ | 0-5 |

The glass ceramic optionally has a proportion of $SiO_2$ of 35 to 72 wt.-%. The proportion of $SiO_2$ is furthermore optionally at most 62 wt.-%, further optionally at most 60 wt.-%. The proportion of $SiO_2$ is further optionally at least 45 wt.-%, optionally at least 50 wt.-% and further optionally at least 54 wt.-%.

The proportion of $Al_2O_3$ is optionally 15 to 33 wt.-%. The glass ceramic optionally contains at least 17 wt.-%, optionally at least 20 wt.-%, yet optionally at least wt.-% $Al_2O_3$. The proportion of $Al_2O_3$ is optionally at least 32 wt.-%, optionally at most 28 wt.-%.

The phosphate content $P_2O_5$ of the glass ceramic is 0 to 12 wt.-%. The glass ceramic optionally contains at least 3 wt.-%, optionally at least 4 wt.-%, yet optionally at least 5 wt.-%, $P_2O_5$. The proportion of $P_2O_5$ is optionally restricted to at most 10 wt.-%, optionally at most 8 wt.-%.

The glass ceramic optionally also contains $TiO_2$ in a proportion of 0 to 6 wt.-%, with an option of at least 1 wt.-%, optionally at least 1.5 wt.-%, $TiO_2$. The proportion of $TiO_2$ is, however, optionally restricted to at most 4 wt.-%, optionally at most 3 wt.-%.

The glass ceramic can also contain $ZrO_2$ in a proportion of at most 5 wt.-%, optionally at most 4 wt.-%. $ZrO_2$ is optionally present in a proportion of at least 0.5 wt.-%, optionally at least 1 wt.-%.

The glass ceramic can furthermore contain alkali metal oxides, such as $Li_2O$, $Na_2O$ and $K_2O$. $Li_2O$ is optionally present in a proportion of at least 2 wt.-%, optionally at least 3 wt.-%. The proportion of $Li_2O$ is optionally restricted to at most 6 wt.-%, optionally at most 5 wt.-%, optionally at most 4 wt.-%. $Na_2O$ and $K_2O$ are optionally present in the glass ceramic. $Na_2O$ is optionally present in a proportion of at most 2 wt.-%, optionally at most 1 wt.-%. The proportion of $K_2O$ is optionally at most 3 wt.-%, optionally at most 2 wt.-%, optionally at most 1 wt.-%. $Na_2O$ and $K_2O$ can in any event and independently of one another be present in a proportion of at least 0.01 wt.-% in the glass ceramic, optionally at least 0.02 wt.-%, optionally at least 0.05 wt.-%.

The glass ceramic can also contain alkaline earth metal oxides, such as MgO, CaO, BaO and/or SrO, and also further bivalent metals such as ZnO. The proportion of CaO is optionally at most 4 wt.-%, optionally at most 3 wt.-%, yet optionally at most 2 wt.-%. The glass ceramic optionally contains at least 0.1 wt.-%, optionally at least 0.5 wt.-%, CaO. MgO can be present in the glass ceramic in a proportion of at most 3 wt.-%, optionally at most 2 wt.-%, and/or optionally at least 0.1 wt.-%. The glass ceramic can contain BaO in a proportion of less than 5 wt.-%, optionally at most 4 wt.-%, and/or optionally at least 0.1 wt.-%. In individual embodiments, the glass ceramics are BaO-free. The glass ceramics can contain SrO in a proportion of at most 3 wt.-% and/or optionally at least 0.1 wt.-%. In individual embodiments, the glass ceramics are SrO-free. As a further metal oxide, the glass ceramic optionally contains ZnO in a proportion of optionally at least 1 wt.-%, optionally at least 1.5 wt.-%. The proportion of ZnO is restricted to at most 8 wt.-%, optionally at most 5 wt.-%, optionally at most 4 wt.-% and optionally at most 4 wt.-%. Some embodiments are free from ZnO.

For the modulation of the optical properties, e.g. refractive index, for example, $Gd_2O_3$, $Y_2O_3$, $HfO_2$, $Bi_2O_3$ and/or $GeO_2$ can be contained in some advantageous variants.

The above glass compositions can optionally contain additions of coloring oxides, such as e.g. $Nd_2O_3$, $Fe_2O_3$, CoO, NiO, $V_2O_5$, $MnO_2$, CuO, $CeO_2$, $Cr_2O_3$, rare earth oxides in contents of in each case individually or in total 0-3 wt.-%. Optional variants are free from coloring oxides.

In some embodiments, the glass ceramic according to the present invention includes from 1.5 wt.-% to 6 wt.-% of at least one component, selected from the group including $TiO_2$, $ZrO_2$, $Ta_2O_5$, $Nb_2O_5$, $SnO_2$, $MoO_3$ and $WO_3$.

According to one advantageous embodiment of the present invention, the composition is free from components which are not mentioned above.

According to one embodiment of the present invention, a transparent glass ceramic is generated. As a result of the transparency, many properties of such a glass ceramic, in particular naturally their inner quality are better influenced. The glass ceramics according to the present invention are transparent, i.e. they have a pure transmission of at least 70% in the wavelength range from 350 to 650 nm. $B_2O_3$ and/or higher fluoride contents can reduce transparency. Advantageous variants therefore do not contain one or both of the stated components.

The glass ceramics generated in the context of the present invention are furthermore pore-free and crack-free. In the context of the present invention, "pore-free" means a porosity of less than 1%, optionally less than 0.5%, optionally less than 0.1%. A crack is a gap, i.e. a discontinuity, in an otherwise continuous structure.

Thermal Coefficient of Expansion CTE

The glass ceramics according to the present invention have zero expansion, i.e. they have an average thermal coefficient of expansion CTE in the range from in particular 0 to 50° C. of at most $0.1 \times 10^{-6}$/K. Some advantageous variants even have an average CTE in the range from in particular 0 to 50° C. of at most $0.05 \times 10^{-6}$/K. It may be advantageous for specific applications if the average CTE is at most $0.1 \times 10^{-6}$/K in a larger temperature range, e.g. in the range from −30° C. to +70° C., optionally in the range from −40° C. to +80° C., i.e. a zero expansion is present.

The differential CTE(T) is initially determined to determine the CTE-T curve of the glass ceramics produced according to the present invention and precision components produced therefrom. The differential CTE(T) is determined as a function of the temperature. The CTE is then defined according to the following formula (1):

$$CTE(T) = (1/l0) \times (\partial l/\partial T) \quad (1).$$

In order to generate a $\Delta l/l0$-T curve or an expansion curve or plotting of change in length $\Delta l/l0$ of a test body (glass ceramic or precision component) against the temperature, the temperature-dependent change in length of the length of a test body can be measured from initial length l0 in the case of starting temperature t0 to length lt in the case of temperature t. Small temperature intervals of, for example, 5° C. or 3° C. or 1° C. are optionally selected to determine a measuring point. Such measurements can be performed, for example, by dilatometric methods, interferometric methods, for example, the Fabry-Perot method, i.e. the evaluation of the displacement of the resonance peak of a laser beam coupled into the material, or other suitable methods are performed. In the context of the present invention, the dilatometric method was selected with a temperature interval of 1° C. on rod-shaped samples of the test bodies with 100 mm length and a diameter of 6 mm to determine the CTE. The selected method for determining the CTE has an accuracy of optionally at least ±0.05 ppm/K, optionally of at least ±0.03 ppm/K. The CTE can, however, naturally also be determined with methods which have an accuracy of at least ±0.01 ppm/K, optionally at least ±0.005 ppm/K or according to some embodiments even of at least ±0.003 ppm/K or at least ±0.001 ppm/K. The average CTE for a specific temperature interval, for example, for the temperature range from 0° C. to 50° C., is calculated from the $\Delta l/l0$-T curve. A CTE-T curve is obtained by the derivation of the $\Delta l/l0$-T curve. The zero crossing, the gradient of the CTE-T curve within a temperature interval can be determined from the CTE-T curve. The properties and location of an advantageous CTE plateau formed in the case of some variants is determined on the basis of the CTE-T curve.

According to one embodiment, a glass ceramic component produced by way of the method according to the present invention involves a precision component (in particular in the form of a substrate) which has a high CTE homogeneity. In this case, the value of the CTE homogeneity (English: "total spatial variation of CTE") refers to what is known as the peak-to-valley value, i.e. the difference between the in each case highest and the in each case lowest CTE value of the samples taken from a precision component. The CTE homogeneity thus does not relate to the CTE of the material of the component, but rather to the spatial variation of the CTE over the section considered or the entire precision component. To determine the CTE homogeneity, a plurality of samples at different locations are taken from a precision component and the CTE value is determined in each case for this which is indicated in ppb/K, wherein 1 ppb/K=0.001× $10^{-6}$/K. The CTE homogeneity, i.e. the spatial variation of the CTE, is advantageously over the entire precision component at most 5 ppb/K, optionally at most 4 ppb/K, most optionally at most 3 ppb/K. A method for determining the CTE homogeneity and measures for achieving the CTE homogeneity are described in WO 2015/124710 A, the disclosure content of which is included in its full scope in this application.

In a further aspect, the invention relates to a precision component including a glass ceramic produced according to the method according to the present invention or the glass ceramic according to the present invention.

A further aspect furthermore relates to the use of the precision component according to the present invention in particular for use in metrology, spectroscopy, measurement technology, lithography, astronomy or earth observation from space, for example, as a mirror or mirror mount for segmented or monolithic astronomical telescopes or also as lightweight or ultra-lightweight mirror substrates for, for example, space-based telescopes or as high-precision structural components for distance measurement e.g. in space or optics for earth observation, as precision components, such as standards for precision measuring technology, precision measuring rods, reference plates in interferometers, as mechanical precision parts, e.g. for ring laser gyroscopes, helical springs for the watchmaking industry, as, for example, mirrors and prisms in LCD lithography, and, for example, as mask frames, wafer tables, reference plates, reference frames and grid plates in microlithography and in EUV microlithography and as mirrors and/or photomask substrates or reticle mask blanks in EUV microlithography.

In one embodiment, the method according to the present invention makes it possible to reduce the required quantity of multivalent oxide refining agents alongside outstanding product quality. The method according to the present invention achieves this in that it increases the quantity of $O_2$ released from the refining agent and thus to improve the conversion rate of the refining agents used in the case of the respectively required refining temperatures. The method according to the present invention therefore achieves improved refining even with small quantities of refining agent used, i.e. a glass or a glass ceramic with only a few bubbles.

In one embodiment, in the case of the method according to the present invention, at least one refining agent of the formula $X_nO_m$, wherein n=1 or 2, wherein m=2 or 5, wherein X=As, Sb, Sn, or Ce, and/or of the formula $M_nSO_4$, wherein n=1 or 2, and M=Na, K, Li, Mg, Ca, Sr, Ba and/or Zn, with a concentration of 2 wt.-% or less, relative to the total mass of the batch of raw materials, is used. Alternatively or additionally, one or more refining agents with a concentration of 2 wt.-% or less, relative to the total mass of the batch of raw materials, and/or a concentration of at least 0.05 wt.-%, at least 0.1 wt.-%, or at least 0.2 wt.-%, relative to the total mass of the batch of raw materials, are used. In one embodiment, one or several refining agents with a concentration of 0.05 to 2 wt.-%, 0.1 to 1 wt.-%, or 0.2 to 0.5 wt.-%, relative to the total mass of the batch of raw materials, are used.

In one embodiment of the method, a combination of two or more refining agents is used, wherein the two or more refining agents are selected from the group of compounds of the formula $X_nO_m$, wherein n=1 or 2, wherein m=2 or 5, wherein X=As, Sb, Sn, or Ce, and/or of the formula $M_nSO_4$, wherein n=1 or 2, and M=Na, K, Li, Mg, Ca, Sr, Ba and/or Zn. If a combination of two or more refining agents is used, the details given here correspondingly apply to the combination of the refining agents.

In one embodiment, an additional refining agent selected from the list of chlorides and fluorides, e.g. NaCl, KCl, NaF, KF, is used.

In one embodiment, the refining agent has the thermodynamic property that it has an at least 30% conversion of the refining agent from a higher into a lower oxidation state in a melt of the same composition as the melt in the refining step in the case of an oxygen partial pressure $p(O_2)$ of 1 bar and a temperature T2, or at least 35% conversion of the refining agent, at least 40% conversion of the refining agent, at least 45% conversion of the refining agent, or at least 50% conversion of the refining agent, in particular according to the reaction of $X_nO_m \rightarrow X_nO_{m-1} + \frac{1}{2} O_2$ and/or $X_nO_m \rightarrow X_nO_{m-2} + O_2$, and/or according to the reaction of $M_nSO_4 + SO_2 + \frac{1}{2} O_2$, wherein temperature T2 corresponds to a viscosity of the molten glass of $10^2$ dPa*s. In one embodiment, the refining agent has the thermodynamic property that it has an at most 99% conversion of the refining agent, at most 95% conversion of the refining agent, at most 90% conversion of the refining agent, or at most 80% conversion of the refining agent, in a melt of the same composition as the melt in the refining step in the case of an oxygen partial pressure $p(O_2)$ of 1 bar and a temperature T2, in particular according to the reaction of $X_nO_m$ $X_nO_{m-1} + \frac{1}{2} O_2$ and/or $X_nO_m \rightarrow X_nO_{m-2} + O_2$, and/or according to the reaction of $M_nSO_4 \rightarrow M_nO + SO_2 + \frac{1}{2} O_2$, wherein temperature T2 corresponds to a viscosity of the molten glass of $10^2$ dPa*s. The conversion of the refining agent is influenced by various factors such as e.g. the temperature of the melt and the oxygen partial pressure in the melt. The respective conversion (in %) for a given refining agent in the case of an oxygen partial pressure $p(O_2)$ of 1 bar and a temperature T2 is based on chemical equilibrium conditions. For example, an at least 30% conversion according to the reaction of $X_nO_m \rightarrow X_nO_{m-1} + \frac{1}{2} O_2$ means that, in the chemical equilibrium condition, at least 30 mol % of the reduced species $X_nO_{m-1}$ relative to the total quantity of $X_nO_m$ and $X_nO_{m-1}$ is present. The indication should optionally be understood such that a refining agent has the thermodynamic property of a degree of conversion in the case of an oxygen partial pressure of 1 bar and a temperature T2 in the melt, but does not characterize a method step, rather a property of the refining agent in hypothetical melting conditions. This optionally does not mean that the melt must be present at a certain point in time in the case of the T2 temperature and/or an oxygen partial pressure of 1 bar must prevail. On the contrary, the feature optionally describes how the refining agent behaves in the case of specific conditions. It thus indicates a selection rule for the refining agent as a function of the composition of the melt. This property of the refining agent can be determined experimentally. A differentiation should be made between this and the method steps actually performed and the conditions which actually prevail. The actual conversion of the refining agent can thus be influenced as described herein, in particular it can be increased by reduction of the oxygen partial pressure.

In one embodiment, the method, and in particular the refining step, is performed for a sufficient time so that an at least 30% conversion, at least 35% conversion, at least 40% conversion, or at least 45% conversion, of the refining agent takes place in the melt in the case of an oxygen partial pressure $p(O_2)$ of 1 bar and a temperature T2. If a mixture of several refining agents is used, this refers to a gross conversion (in mol %) of at least 30% conversion, at least 35% conversion, at least 40% conversion, or at least 45% conversion, which relates to the sum of the amount of substance proportions of the refining agents used. This means that, in the chemical equilibrium condition, at least 30 mol % of the sum of all reduced species relative to the total amount of substance of reduced and oxidized species is present. The person skilled in the art is able to both theoretically estimate and determine by measurement technology and confirm the necessary time (cf. e.g. FIG. 3) which is required for a desired conversion of the refining agent in the case of a temperature T2. This time can correspond to an average dwell time of the melt in a refining vessel or refining section of 2 to 18 hours in a continuous process. This time can analogously correspond to a refining period of 2 to 96 hours in a discontinuous process.

In one embodiment, the method according to the present invention includes the step of adjusting an oxygen partial pressure $p(O_2)$ during the refining of the melt which is reduced by at least 60%, optionally at least 70%, relative to the $O_2$ saturation in the melt in the case of temperature T3. The $O_2$ saturation in the melt and the reduced oxygen partial pressure $p(O_2)$ during the refining of the melt relate to chemical equilibrium conditions in the case of the respectively adjusted temperature.

Figure 2:
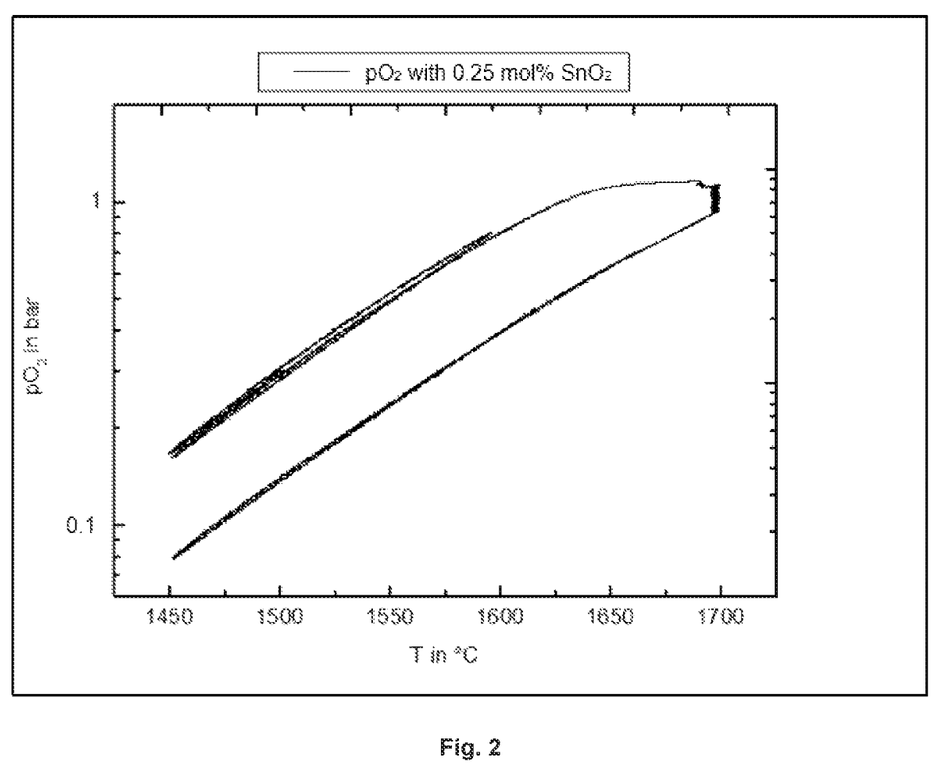
FIG. 2 shows the profile of the oxygen partial pressure $p(O_2)$ of a melt refined with $SnO_2$ of a glass which can be ceramized to form a glass ceramic.

In one embodiment, the method is characterized in that an oxygen partial pressure $p(O_2)$ is adjusted during the refining of the melt which is reduced by at least 60%, optionally at least 70%, relative to the $O_2$ saturation in the melt in the case of temperature T3 (cf. e.g. FIG. 2). The $O_2$ saturation in the melt and the reduced oxygen partial pressure $p(O_2)$ during refining of the melt optionally relate to chemical equilibrium conditions in the case of the respectively adjusted temperature. The reference to the $O_2$ saturation in the melt in the case of temperature T3 optionally only serves as a reference value. It is thus optionally not meant that an equilibrium state must actually be achieved in the case of this temperature. This method feature can be realized e.g. by adjusting a correspondingly selected temperature and/or the use of a low oxygen-fuel equivalence ratio λ. Alternatively or additionally, this method feature can be realized e.g. by the use of an absolute pressure of 0.5 bar or less, 0.4 bar or less, 0.3 bar or less, 0.2 bar or less, 0.1 bar or less, or 0.05 bar or less, in the region above the glass melt. The absolute pressure above the melt during refining is, however, optionally at least 0.5 bar.

The reduction in the oxygen partial pressure $p(O_2)$ in the glass melt by at least 60%, optionally at least 70%, relative to the $O_2$ saturation in the melt in the case of temperature T3, ensures a displacement of the respective equilibrium according to the reaction of $X_nO_m \rightarrow X_nO_{m-1} + \frac{1}{2} O_2$ or $X_nO_m \rightarrow X_nO_{m-2} + O_2$, or according to the reaction of $M_nSO_4 \rightarrow M_nO + SO_2 + \frac{1}{2} O_2$, in favor of the product side, i.e. in favor of the reduced refining agent and the thereby generated $O_2$.

In one embodiment, a refining agent of the formula $X_nO_m$ is used, wherein n=1 or 2, wherein m=2 or 5, wherein X=As, Sb, Sn, or Ce. In one embodiment, a refining agent of the formula $M_nSO_4$ is used, wherein n=1 or 2, M=Na, K, Li, Mg, Ca, Sr, Ba and/or Zn. In an embodiment which is both dependent on and independent of this, a refining agent with a concentration of 2 wt.-% or less, relative to the total mass of the batch of raw materials, and/or a concentration of at least 0.05 wt.-%, at least 0.1 wt.-%, or at least 0.2 wt.-%, relative to the total mass of the batch of raw materials, is used. In one embodiment, a refining agent is used with a concentration of 0.05 to 2 wt.-%, 0.1 to 1 wt.-%, or 0.2 to 0.5 wt.-%, relative to the total mass of the batch of raw materials.

In one embodiment, a refining agent is selected which has the thermodynamic property that it has an at least 30% conversion of the refining agent, at least 35% conversion of the refining agent, at least 40% conversion of the refining agent, at least 45% conversion of the refining agent, or at least 50% conversion of the refining agent, in a melt of the same composition as the melt in the refining step in the case of an oxygen partial pressure $p(O_2)$ of 1 bar and a temperature T2, according to the reaction of $X_nO_m \rightarrow X_nO_{m-1} + \frac{1}{2} O_2$ and/or $X_nO_m \rightarrow X_nO_{m-2} + O_2$, and/or according to the reaction of $M_nSO_4 \rightarrow MnO + SO_2 + \frac{1}{2} O_2$, wherein temperature T2 corresponds to a viscosity of the molten glass of $10^2$ dPa*s. In one embodiment, a refining agent is selected which has the thermodynamic property that it has an at most 99% conversion of the refining agent, at most 95% conversion of the refining agent, at most 90% conversion of the refining agent, or at most 80% conversion of the refining agent, in a melt of the same composition as the melt in the refining step in the case of an oxygen partial pressure $p(O_2)$ of 1 bar and a temperature T2, according to the reaction of $X_nO_m \rightarrow X_nO_{m-1} + \frac{1}{2} O_2$ and/or $X_nO_m \rightarrow X_nO_{m-2} + O_2$, and/or according to the reaction of $M_nSO_4 \rightarrow MnO + SO_2 + \frac{1}{2} O_2$, wherein temperature T2 corresponds to a viscosity of the molten glass of $10^2$ dPa*s.

In one embodiment of the method, the method includes the step of adjusting an oxygen partial pressure $p(O_2)$ in the glass melt which is reduced by at least 60%, optionally at least 70%, or at least 80%, relative to the $O_2$ saturation in the melt in the case of temperature T3. In one embodiment of the method, the method includes the step of adjusting an oxygen partial pressure $p(O_2)$ in the glass melt which is reduced by at most 99%, optionally at most 95%, or at most 90%, relative to the $O_2$ saturation in the melt in the case of temperature T3. In one embodiment of the method, the method includes the step of adjusting an oxygen partial pressure $p(O_2)$ in the glass melt which is reduced by 60% to 99%, optionally 70% to 95%, or 80% to 90%, relative to the $O_2$ saturation in the melt in the case of temperature T3.

In one embodiment, the ratio of $Fe^{2+}$ to $Fe^{3+}$ in the glass which can be ceramized to form glass ceramic or in the glass ceramic is at least 0.01, at least 0.02, or at least 0.05. In one embodiment, the ratio of $Fe^{2+}$ to $Fe^{3+}$ in the glass which can be ceramized to form glass ceramic or in the glass ceramic is at most 1.00, at most 0.50, at most 0.20, or at most 0.10. In one embodiment, the ratio of $Fe^{2+}$ to $Fe^{3+}$ in the glass which can be ceramized to form glass ceramic or in the glass ceramic is from 0.01 to 1.0, from 0.02 to 0.50, or from 0.05 to 0.20, or from 0.05 to 0.10. The method facilitates the release of oxygen from the respectively used refining agent and thus enables the adjustment of desired redox conditions in terms of a $Fe^{2+}$ to $Fe^{3+}$ ratio to be achieved in the glass which can be ceramized to form glass ceramic or in the glass ceramic. In particular, the method facilitates reducing conditions which, as a function of the original $Fe^{2+}$ to $Fe^{3+}$ ratio, displace the equilibrium to the benefit of $Fe^{2+}$ and thereby improve the refining result.

In one embodiment, relating to both the method and the glass ceramic, the $X_nO_{m-1}$ to $X_nO_m$ ratio or the $X_nO_{m-2}$ to $X_nO_m$ ratio in the (refined) glass which can be ceramized to form glass ceramic is at least 0.6, at least 0.7, at least 0.8, at least 1.0, or at least 2.0. In one embodiment, the $X_nO_{m-1}$ to $X_nO_m$ ratio or the $X_nO_{m-2}$ to $X_nO_m$ ratio in the (refined) glass which can be ceramized to form glass ceramic is at most 99.0, at most 90.0, at most 50.0, at most 10.0, or at most 5.0. In one embodiment, the $X_nO_{m-1}$ to $X_nO_m$ ratio or the $X_nO_{m-2}$ to $X_nO_m$ ratio in the (refined) glass which can be ceramized to form glass ceramic is from 0.6 to 99.0, from 0.7 to 90.0, from 0.8 to 50.0, from 1.0 to 10.0, or from 2.0 to 5.0. The method facilitates the release of oxygen from the respectively used refining agent and thus enables the adjustment of a desirable or desired ratio between the reduced and the oxidized form of the respectively used refining agent of the (refined) glass which can be ceramized to form glass ceramic.

In one embodiment, the refining agent is selected from the list of $Na_2SO_4$, $K_2SO_4$, $Li_2SO_4$, $MgSO_4$, $CaSO_4$, $SrSO_4$, $ZnSO_4$, $Sb_2O_5$, $As_2O_5$, $CeO_2$ and $SnO_2$ or mixtures thereof.

The refining agents $Sb_2O_5$, $As_2O_5$, $CeO_2$ and $SnO_2$ are normally made available at the start in the batch of raw materials in their respectively lowest oxidation state. For example, the refining agents $Sb_2O_5$ and $As_2O_5$ are made available in the batch of raw materials normally in the form of $Sb_2O_3$ and $As_2O_3$. The indications in weight-% (wt.-%) relate to the sum of all oxidized and reduced species of the respective refining agent $Sb_2O_5$, $As_2O_5$, $CeO_2$ and $SnO_2$ and therefore include in each case $Sb_2O_3$, $As_2O_3$, CeO and SnO.

In one embodiment, the refining agent is $SnO_2$, in particular the refining agent is $SnO_2$ and is used in a concentration of 0.05 to 2 wt.-%, 0.1 to 1 wt.-%, or 0.2 to 0.5 wt.-%, relative to the total mass of the batch of raw materials.

In one embodiment, the refining agent is $As_2O_5$, in particular the refining agent is $As_2O_5$ and is used in a concentration of 0.05 to 2 wt.-%, 0.1 to 1 wt.-%, or 0.2 to 0.5 wt.-%, relative to the total mass of the batch of raw materials.

In one embodiment, the refining agent is $Sb_2O_5$, in particular the refining agent is $Sb_2O_5$ and is used in a concentration of 0.05 to 2 wt.-%, 0.1 to 1 wt.-%, or 0.2 to 0.5 wt.-%, relative to the total mass of the batch of raw materials.

In one embodiment, the refining agent is $Na_2SO_4$, in particular the refining agent is $Na_2SO_4$ and is used in a concentration of 0.05 to 2 wt.-%, 0.1 to 1 wt.-%, or 0.2 to 0.5 wt.-%, relative to the total mass of the batch of raw materials.

In one embodiment, the glass ceramic produced by way of the method according to the invention has good inner quality.

They optionally have at most 5 inclusions per 100 $cm^3$, optionally at most 3 inclusions per 100 $cm^3$, optionally at most 1 inclusion per 100 $cm^3$. According to the present invention, the term inclusions refers both to bubbles as well as crystallites, optionally bubbles, which have a diameter of more than 0.3 mm. According to one variant of the present invention, glass ceramics or precision components produced therefrom are provided which have a diameter or an edge length of at most 800 mm and a thickness of at most 100 mm and which have at most 5, optionally at most 3, optionally at most 1 inclusions in each case per 100 $cm^3$ with a diameter of a size of more than 0.03 mm. In addition to the number of inclusions, the maximum diameter of the detectable inclusions also serves as a measure for the level of inner quality. The maximum diameter of individual inclusions in the total volume of a precision component with a diameter of less than 500 mm is optionally at most 0.6 mm, in the volume critical for the application, for example, close to the surface, optionally at most 0.4 mm. The maximum diameter of individual inclusions in glass ceramic components with a diameter of 500 mm up to less than 2 m is optionally at most 3 mm, in the volume critical for the application, for example, close to the surface, optionally at most 1 mm.

In one embodiment, the (refined) glass which can be ceramized to form glass ceramic or the glass ceramic (referred to below as "glass ceramic") has fewer than 80 bubbles of a size of 0.03 mm to 0.05 mm per 10 kg glass ceramic and/or fewer than 80 bubbles of a size of more than 0.05 mm to 0.1 mm per 10 kg glass ceramic and/or fewer than 80 bubbles of a size of more than 0.1 mm to 0.2 mm per 10 kg glass ceramic and/or fewer than 2 bubbles of a size of more than 0.2 mm per 10 kg glass ceramic.

In one embodiment, the (refined) glass which can be ceramized to form glass ceramic or the glass ceramic has fewer than 80 bubbles of a size of 0.03 mm to 0.05 mm per 10 kg glass ceramic, fewer than 40 bubbles of a size of 0.03 mm to 0.05 mm per 10 kg glass ceramic, fewer than 10 bubbles of a size of 0.03 mm to 0.05 mm per 10 kg glass ceramic, fewer than 5 bubbles of a size of 0.03 mm to 0.05 mm pro 10 kg glass ceramic, or fewer than 2 bubbles of a size of 0.03 mm to 0.05 mm per 10 kg glass ceramic.

In one embodiment, the (refined) glass which can be ceramized to form glass ceramic or the glass ceramic has fewer than 80 bubbles of a size of 0.05 mm to 0.1 mm per 10 kg glass ceramic, fewer than 40 bubbles of a size of 0.05 mm to 0.1 mm per 10 kg glass ceramic, fewer than 10 bubbles of a size of 0.05 mm to 0.1 mm per 10 kg glass ceramic, fewer than 5 bubbles of a size of 0.05 mm to 0.1 mm per 10 kg glass ceramic, or fewer than 2 bubbles of a size of 0.05 mm to 0.1 mm per 10 kg glass ceramic.

In one embodiment, the (refined) glass which can be ceramized to form glass ceramic or the glass ceramic has fewer than 80 bubbles of a size of 0.1 mm to 0.2 mm per 10 kg glass ceramic, fewer than 40 bubbles of a size of 0.1 mm to 0.2 mm per 10 kg glass ceramic, fewer than 10 bubbles of a size of 0.1 mm to 0.2 mm per 10 kg glass ceramic, fewer than 5 bubbles of a size of 0.1 mm to 0.2 mm per 10 kg glass ceramic, or fewer than 2 bubbles of a size of 0.1 mm to 0.2 mm per 10 kg glass, and/or fewer than 2 bubbles of a size of more than 0.2 mm per 10 kg glass.

In one embodiment, the (refined) glass which can be ceramized to form glass ceramic or the glass ceramic has at least 0.1 bubbles of a size of 0.1 mm to 0.2 mm per 10 kg glass, or at least 0.5 bubbles of a size of 0.1 mm to 0.2 mm per 10 kg glass, and/or at least 0.1 bubbles of a size of more than 0.2 mm per 10 kg glass.

The reference of a specific number of bubbles per 10 kg glass equally applies to 10 kg glass ceramic or 10 kg glass which can be ceramized to form glass ceramic, and should be understood in an analogous manner. Moreover, the feature of a specific number of bubbles per 10 kg glass should not be understood such that the glass ceramic or the glass which can be ceramized to form glass ceramic must have a mass of 10 kg. The reference mass of 10 kg only serves to determine the number of bubbles in a glass ceramic or a glass which can be ceramized to form glass ceramic of a different mass in a comparative manner.

The size of a bubble relates to the diameter of a bubble. In the case of non-spherical bubbles, the size relates to the average between the shortest and the longest distance over the field of vision.

In one embodiment, the method is performed discontinuously. This is advantageous, in particular in conjunction with $H_2$ and $O_2$ firing, because as a result of this the refining phase can be lengthened so that the reduction in the oxygen partial pressure $p(O_2)$ inherent with an increase in the refining agent conversion can be particularly well controlled and adjusted during refining of the melt.

In one embodiment of the method, the refining period in a discontinuous method is at least 2 hours, at least 8 hours, at least 16 hours, or at least 24 hours, however, at most 96 hours, at most 72 hours, or at most 48 hours. In one embodiment of the method, the refining period in a discontinuous method is 2 to 96 hours, 8 to 72 hours, 16 to 72 hours, or 24 to 48 hours.

The adjustment of a specific duration of the refining in a discontinuous method enables sufficient reaction time or sufficient conversion of the refining agent used, as well as a (inherent) sufficient release of $O_2$ from the melt, as well as an adjustment of the basic chemical equilibria. This refers in particular to the chemical equilibria between the reduced and oxidized form of the refining agent used in the (glass) melt, as well as the chemical equilibrium between the oxygen partial pressure $p(O_2)$ in the glass melt and above the glass melt (as a function of the temperature).

In one embodiment of the method, the refining is performed in a continuous method, wherein the average dwell time of the melt during the refining is at least 2 hours, at least 4 hours, at least 6 hours, or at least 8 hours. The average dwell time of the melt during the refining is, however, at most 18 hours, at most 16 hours, at most 14 hours, or at most 12 hours. In one embodiment of the method, the refining is performed in a continuous method, wherein the average dwell time of the melt during the refining is 2 to 18 hours, 4 to 16 hours, 6 to 14 hours, or 8 to 12 hours.

The adjustment of a specific average dwell time of the melt during the refining in a continuous method enables sufficient reaction time or sufficient conversion of the refining agent used, as well as a (inherent) sufficient release of $O_2$ from the melt, as well as an adjustment of the basic chemical equilibria. This refers in particular to the chemical equilibria between the reduced and oxidized form of the refining agent used in the (glass) melt, as well as the chemical equilibrium between the oxygen partial pressure $p(O_2)$ in the glass melt and above the glass melt (as a function of the temperature).

In a further aspect, the present invention relates to a glass ceramic which can be produced or is produced according to any one of the methods described above.

In a further aspect, the present invention relates to a glass ceramic, wherein less than 500 kg, optionally less than 250 kg, optionally less than 100 kg, further optionally less than 50 kg, particularly optionally less than 10 kg, $CO_2$ is released per tonne glass as a result of the production of the green glass.

In one embodiment of the glass ceramic or the glass which can be ceramized to form glass ceramic, the glass or the glass ceramic has a neutral carbon footprint.

In one embodiment, the glass ceramic according to the present invention has a $Fe^{2+}$ to $Fe^{3+}$ ratio of at least 0.01, wherein the glass ceramic has fewer than 80 bubbles of a size of 0.03 mm to 0.05 mm per 10 kg glass ceramic and/or fewer than 80 bubbles of a size of more than 0.05 mm to 0.1 mm and/or fewer than 80 bubbles of a size of more than 0.1 mm to 0.2 mm per 10 kg glass ceramic and/or fewer than 2 bubbles of a size of more than 0.2 mm per 10 kg glass ceramic. The embodiments in relation to the production methods according to the present invention apply analogously to (i.e. in the context of) the glass ceramics according to the present invention.

The electrolysis of $H_2O$ is advantageously operated with electricity which has a neutral carbon footprint.

A neutral carbon footprint is regarded in the context of the present disclosure as a generation of electricity, in the case of which the amount of total existing $CO_2$ is not increased by the generation of the electricity. Consequently, electricity obtained by solar energy, wind, water and/or atomic power is regarded as electricity with a neutral carbon footprint.

In one embodiment of the glass which can be ceramized to form glass ceramic, the glass includes a refining agent $X_nO_m$ which has the thermodynamic property that it has an $O_2$ release of at most 30%, at most 20%, or at most 10%, from the refining agent in a melt of the same composition as the melt in the refining step in the case of an oxygen partial pressure $p(O_2)$ of 1 bar and a temperature T2.

Figure 1:
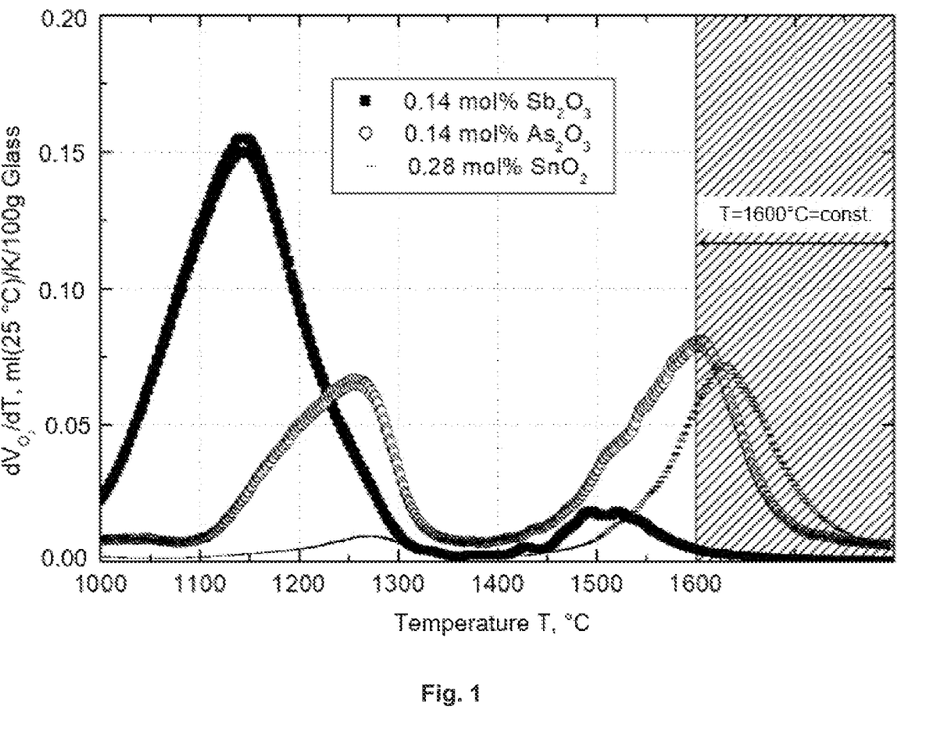
FIG. 1 shows the oxygen release of the refining agents $Sb_2O_3$, $As_2O_3$ and $SnO_2$ in a glass which can be ceramized to form a glass ceramic as a function of the temperature.

FIG. 1 shows the release of oxygen of the refining agents $Sb_2O_3$, $As_2O_3$ and $SnO_2$ in a glass which can be ceramized to form a glass ceramic as a function of the temperature.

FIG. 2 shows the profile of the oxygen partial pressure $p(O_2)$ of a glass ceramic refined with $SnO_2$. If the refining temperature of a glass is achieved with oxidic refining agents, the $p(O_2)$ of the melt is usually at most approx. 1 bar. A proportion of the oxidic refining agent is transferred from the oxidized into the reduced state. The $p(O_2)$ profile flattens off from 1600° C. and from 1650° C. the $p(O_2)$ curve runs approximately constantly in the case of approximately 1 bar. From a temperature of 1700° C., the $p(O_2)$ falls significantly as a result of the exchange with the atmosphere and drops to approximately 0.2 bar. As a result of this reduction in the $p(O_2)$, the conversion rate of the refining agent is further increased to the benefit of $Sn^{2+}$ or SnO.

Figure 3:
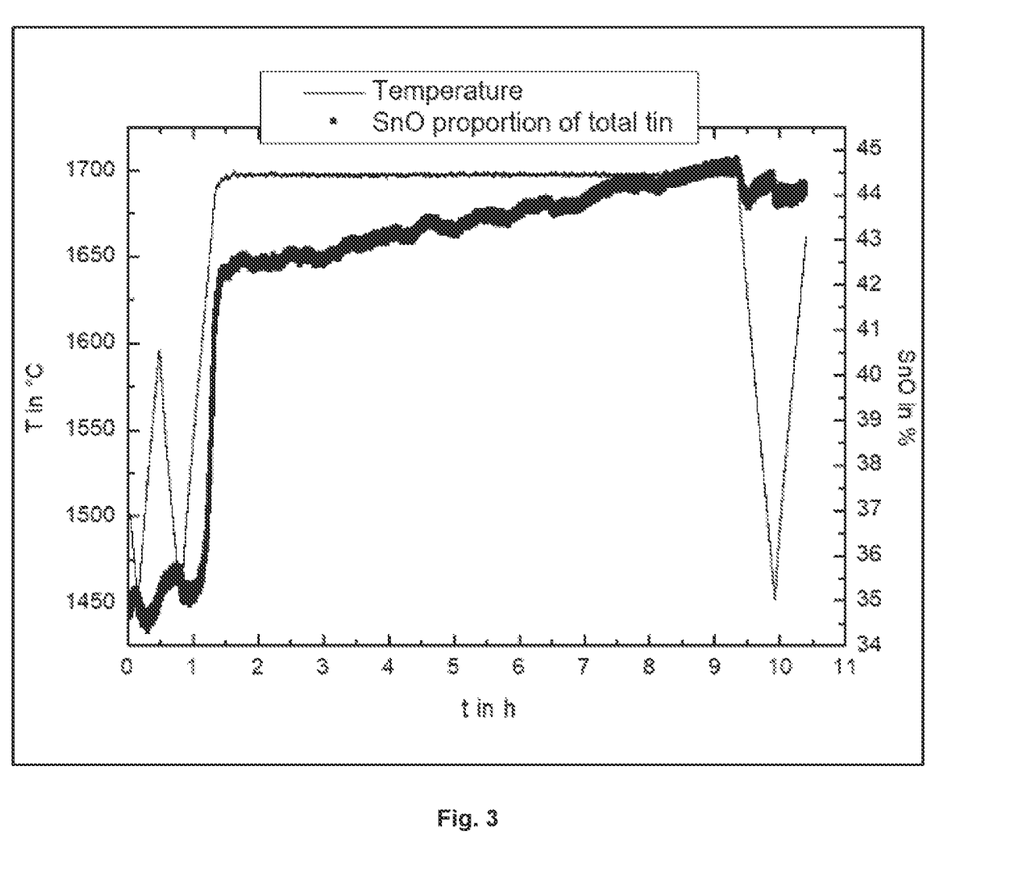
FIG. 3 shows the SnO proportion in mol % relative to the total quantity of tin, i.e. SnO and $SnO_2$, in an $SnO_2$-refined glass ceramic as a function of the temperature and time of the melting process and refining process.

FIG. 3 shows the SnO proportion relative to the total quantity of tin, i.e. SnO and $SnO_2$, in a $SnO_2$-refined glass ceramic as a function of the temperature and time of the melting and refining method. Prior to the refining step, the SnO proportion in the total quantity to tin is approx. 35% (molar ratio of SnO to SnO and $SnO_2$). As a result of the increase to a refining temperature of 1700° C., the SnO proportion increases to approx. 42.5%. As a result of the holding the method at this refining temperature and the falling $pO_2$ value (cf. FIG. 2), the SnO proportion increases to 44.5%.

The tin conversion during the refining step is of importance here for the success of the refining, i.e. in relation to reduced bubbles in the refined glass ceramic. The additional tin conversion is, as a result of the increase to 1700° C. (at t=1.5 h), approx. 7.5% SnO. As a result of the holding at 1700° C. for approximately 8 hours and the exchange of the melt with the gas atmosphere, the reduction in $pO_2$ in the melt arises, and a further 2% of the existing tin is converted to SnO. At 1700° C., the viscosity of the glass ceramic is lower by a factor of 2 than at 1600° C. As a result of this, the remaining bubbles in the case of 1700° C. rise by a factor of 2 faster than in the case of 1600° C. The bubble removal in the case of 1700° C., which temperature is maintained during refining, is largely determined by the ongoing SnO conversion.

A glass ceramic is generally produced as follows: Suitable raw materials are, in a suitable composition, melted, refined, homogenized and hot-formed to form a glass blank or green body or the green glass. The term "green body" of a glass ceramic is referred to as a vitreous body melted from a suitable composition which can be transformed into a glass ceramic by treatment with a suitable temperature program.

After weighing in the components, the batch is mixed by way of a conventional stirrer and is subsequently transported to and placed in the melting tank.

The melting of the green glass is performed in several steps:
Melting down;
Where necessary, homogenization;
Refining;
Where necessary, further homogenization;
Where necessary, a resting phase;
Casting.

After complete melting down of the batch, a first homogenization is optionally performed. The melt can be homogenized by bubbling, thermally or mechanically. The term thermal homogenization refers to the fact that the convection of the melt is aided by increasing the temperature or varying heating of the tank surfaces. The temperature of the melt is subsequently increased to approx. 1600° C. for the refining process. A second homogenization can subsequently be performed. For example, the melt can be kept at an elevated temperature for a few days, wherein the duration of the holding time is dependent on the volume of the melt. It is suspected that a further homogenization of the melt occurs at a molecular level during such a holding or resting phase.

The green glass is subsequently cast into metal molds, as are described, for example, in DE 102004052514A1. The casting mold is subsequently moved to the side out of the region below the melting tank and transferred into a furnace for controlled cooling. The controlled cooling to room temperature is performed with a sufficiently low cooling speed in order to avoid tension and the formation of cracks.

The glass block produced in this manner optionally undergoes a visual inspection for freedom from bubbles, freedom from cracks, etc. Initial mechanical processing, in particular the removal of the surface regions, can subsequently be performed before the ceramization of the green body to form the glass ceramic is performed.

During the temperature treatment, referred to as ceramization, the green glass or the glass or the green body is converted into a glass ceramic by controlled volume crystallization. During this temperature treatment, in a first conversion step ("formation of crystallization seeds"), crystallization seeds of their own or a different type form in the glass. The terms crystallisation seeds or seed crystals refer to sub-microscopic crystalline units of a characteristic size. In a second conversion step ("crystal growth") possibly in the case of a slightly higher temperature, crystals or crystallites grow from the seed crystals.

Viscosity

The viscosity can be determined e.g. by way of rotational viscometry, e.g. via DIN ISO 7884-2:1998-2. The relationship between viscosity and temperature is described by the VFT equation (Vogel-Fulcher-Tammann).

Iron Content

The iron content was determined by way of spectrometry analysis in the obtained glass product, in accordance with DIN 51001:2003-08. In particular, the ratio between $Fe^{2+}$ and $Fe^{3+}$ in the obtained glass product was determined as follows quantitatively by deconvolution of the UV/vis transmission spectra.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for producing a glass ceramic, the method comprising the steps of:
   providing a batch of raw materials;
   heating the batch of raw materials until a melt is obtained, the batch of raw materials being heated at least in a plurality of sections to a temperature above T3 which corresponds to a viscosity of a molten glass of $10^3$ dPa*s;
   refining the melt, the melt being heated at least in a plurality of sections to a temperature above T2.5 which corresponds to a viscosity of the molten glass of $10^{2.5}$ dPa*s;
   obtaining a refined glass which is configured for being ceramized to form a glass ceramic material; and
   ceramizing the refined glass to form the glass ceramic material, wherein at least one of the step of heating until the melt is obtained and the step of refining being performed with heating is by way of $H_2$ and $O_2$ combustion, wherein a $Fe^{2+}$ to $Fe^{3+}$ ratio in the glass ceramic or in the refined glass which can be ceramized to form the glass ceramic material is at least 0.01.

2. The method according to claim 1, wherein the glass which is configured for being ceramized to form the glass ceramic material or the glass ceramic comprises the following composition (in wt.-%, on an oxide basis):

| | |
|---|---|
| $SiO_2$ | 35-72 |
| $Al_2O_3$ | 15-33 |
| $P_2O_5$ | 0-12 |
| $Li_2O$ | 2-6 |
| $Na_2O$ | 0-2 |
| $K_2O$ | 0-3 |
| $MgO$ | 0-3 |
| $CaO$ | 0-4 |
| $BaO$ | 0-5 |
| $SrO$ | 0-3 |
| $ZnO$ | 0-8 |
| $TiO_2$ | 1-6 |
| $ZrO_2$ | 0-5. |

3. The method according to claim 1, wherein the step of refining is performed with an oxygen to fuel equivalence ratio λ which is lower than 1.05.

4. The method according to claim 1, wherein at least one of:
   the step of heating until the melt is obtained is performed with an oxygen to fuel equivalence ratio λ>1.00; and
   the step of refining is performed with an oxygen to fuel equivalence ratio λ<1.05.

5. The method according to claim 1, wherein at least one refining agent of the formula $X_nO_m$, wherein n=1 or 2, m=2 or 5, and X=As, Sb, Sn, or Ce, and/or of the formula $M_nSO_4$, wherein n=1 or 2, and M=at least one of Na, K, Li, Mg, Ca, Sr, Ba and Zn is used, with a concentration of 2 wt.-% or less relating to a sum of all oxidized and reduced species of each of the at least one refining agent, relative to a total mass of the batch of raw materials.

6. The method according to claim 5, wherein the at least one refining agent has a thermodynamic property of an at least 30% conversion of the at least one refining agent from a higher into a lower oxidation state, according to a reaction of $X_nO_m \to X_nO_{m-1} + \frac{1}{2}O_2$ and $X_nO_m \to X_nO_{m-2} + O_2$ when the at least one refining agent has the formula $X_nO_m$, and/or of $M_nSO_4 \to M_nO + SO_2 + \frac{1}{2}O_2$ when the at least one refining agent has the formula $M_nSO_4$, in a melt of a same composition as the melt in the step of refining in a case of an oxygen partial pressure $p(O_2)$ of 1 bar and a temperature T2, wherein the temperature T2 corresponds to a viscosity of the molten glass of $10^2$ dPa*s.

7. The method according to claim 6, wherein an $X_nO_{m-1}$ to $X_nO_m$ ratio or an $X_nO_{m-2}$ to $X_nO_m$ ratio in the refined glass which can be ceramized to form the glass ceramic material or the glass ceramic is at least 0.6.

8. The method according to claim 6, wherein the at least one refining agent is selected from the following: $Na_2SO_4$; $K_2SO_4$; $Li_2SO_4$; $MgSO_4$; $CaSO_4$; $SrSO_4$; $ZnSO_4$; $Sb_2O_5$; $As_2O_5$; $CeO_2$; and $SnO_2$.

9. The method according to claim 5, wherein the at least one refining agent has the formula $X_nO_m$ and has a thermodynamic property having an $O_2$ release of at most 30% from the at least one refining agent in a melt of a same composition as the melt in the step of refining in a case of an oxygen partial pressure $p(O_2)$ of 1 bar and a temperature T2.

10. The method according to claim 1, further comprising a step of adjusting an oxygen partial pressure $p(O_2)$ during the step of refining the melt, which is reduced by at least 60% relative to an $O_2$ saturation in the melt in a case of the temperature T3.

11. The method according to claim 1, wherein the method is performed discontinuously.

12. The method according to claim 1, wherein less than 500 kg of $CO_2$ is released per tonne of glass as a result of a production of the refined glass.

13. The method according to claim 1, wherein the glass ceramic has an average thermal coefficient of expansion CTE in a range from 0 to 50° C. of at most $0.1 \times 10^{-6}$/K.

14. The method according to claim 1, wherein the glass ceramic has a neutral carbon footprint.

15. The method according to claim 1, wherein at least 10% of an energy required for the method is provided by way of $H_2$ and $O_2$ combustion.

16. A method for producing a glass ceramic, the method comprising the steps of:
   providing a batch of raw materials;
   heating the batch of raw materials until a melt is obtained, the batch of raw materials being heated at least in a plurality of sections to a temperature above T3 which corresponds to a viscosity of a molten glass of $10^3$ dPa*s;

refining the melt, the melt being heated at least in a plurality of sections to a temperature above T2.5 which corresponds to a viscosity of the molten glass of $10^{2.5}$ dPa*s;

obtaining a refined glass which is configured for being ceramized to form a glass ceramic material; and ceramizing the refined glass to form the glass ceramic material, wherein at least one of the step of heating until the melt is obtained and the step of refining being performed with heating is by way of $H_2$ and $O_2$ combustion, the method being performed with an oxygen to fuel equivalence ratio $\lambda$ which is lower than 1.05, wherein at least one refining agent of the formula $X_nO_m$, wherein n=1 or 2, m=2 or 5, and X=As, Sb, Sn, or Ce, and/or of the formula $M_nSO_4$, wherein n=1 or 2, and M=at least one of Na, K, Li, Mg, Ca, Sr, Ba and Zn is used, with a concentration of 0.5 wt.-% or less relating to a sum of all oxidized and reduced species of one each of the at least one refining agent, relative to a total mass of the batch of raw materials, wherein the at least one refining agent has a thermodynamic property of an at least 30% conversion of the at least one refining agent from a higher into a lower oxidation state according to a reaction of $X_nO_m \rightarrow X_nO_{m-1}+\frac{1}{2}O_2$ and $X_nO_m \rightarrow X_nO_{m-2}+O_2$ when the at least one refining agent has the formula $X_nO_m$, and/or of $M_nSO_4 \rightarrow M_nO+SO_2+\frac{1}{2}O_2$ when the at least one refining agent has the formula $M_nSO_4$, in a melt of a same composition as the melt in the step of refining in a case of an oxygen partial pressure $p(O_2)$ of 1 bar and a temperature T2, wherein the temperature T2 corresponds to a viscosity of the molten glass of $10^2$ dPa*s and an $X_nO_{m-1}$ to $X_nO_m$ ratio or $X_nO_{m-2}$ to $X_nO_m$ ratio in the refined glass which can be ceramized to form the glass ceramic material or the glass ceramic is at least 0.6.

17. A method for producing a glass ceramic, the method comprising the steps of:

providing a batch of raw materials;

heating the batch of raw materials until a melt is obtained, the batch of raw materials being heated at least in a plurality of sections to a temperature above T3 which corresponds to a viscosity of a molten glass of $10^3$ dPa*s;

refining the melt, the melt being heated at least in a plurality of sections to a temperature above T2.5 which corresponds to a viscosity of the molten glass of $10^{2.5}$ dPa*s;

obtaining a refined glass which is configured for being ceramized to form a glass ceramic material; and ceramizing the refined glass to form the glass ceramic material, wherein at least one of the step of heating until the melt is obtained and the step of refining is performed with heating by way of $H_2$ and $O_2$ combustion, wherein the step of heating until the melt is obtained is performed with an oxygen to fuel equivalence ratio $\lambda>1.00$; and the step of refining is performed with an oxygen to fuel equivalence ratio $\lambda<1.05$, wherein at least one refining agent at least one of of the formula $X_nO_m$, wherein n=1 or 2, m=2 or 5, and X=As, Sb, Sn, or Ce, and of the formula $M_nSO_4$, wherein n=1 or 2, and M=at least one of Na, K, Li, Mg, Ca, Sr, Ba and Zn is used, with a concentration of 0.5 wt.-% or less relating to a sum of all oxidized and reduced species of a respective one of the at least one refining agent, relative to a total mass of the batch of raw materials.

18. The method according to claim 17, wherein the at least one refining agent has a thermodynamic property of an at least 30% conversion of the at least one refining agent from a higher into a lower oxidation state, according to a reaction of $X_nO_m \rightarrow X_nO_{m-1}+\frac{1}{2}O_2$ and $X_nO_m \rightarrow X_nO_{m-2}+O_2$ when the at least one refining agent has the formula $X_nO_m$, and/or of $M_nSO_4 \rightarrow M_nO+SO_2+\frac{1}{2}O_2$ when the at least one refining agent has the formula $M_nSO_4$, in a melt of a same composition as the melt in the step of refining in a case of an oxygen partial pressure $p(O_2)$ of 1 bar and a temperature T2, wherein the temperature T2 corresponds to a viscosity of the molten glass of $10^2$ dPa*s.

* * * * *